(12) United States Patent
Kastroulis

(10) Patent No.: US 12,468,704 B2
(45) Date of Patent: Nov. 11, 2025

(54) SYSTEMS AND METHODS FOR ARTIFICIAL INTELLIGENCE-BASED DATA SYSTEM OPTIMIZATION

(71) Applicant: Carrera Group, Inc., Jacksonville Beach, FL (US)

(72) Inventor: Angelo Kastroulis, Jacksonville Beach, FL (US)

( * ) Notice: Subject to any disclaimer, the term of this patent is extended or adjusted under 35 U.S.C. 154(b) by 290 days.

(21) Appl. No.: 17/461,763

(22) Filed: Aug. 30, 2021

(65) Prior Publication Data

US 2022/0067046 A1    Mar. 3, 2022

Related U.S. Application Data

(60) Provisional application No. 63/072,631, filed on Aug. 31, 2020.

(51) Int. Cl.
| | | |
|---|---|---|
| *G06F 16/2453* | (2019.01) | |
| *G06F 11/34* | (2006.01) | |
| *G06F 16/22* | (2019.01) | |
| *G06N 5/022* | (2023.01) | |

(52) U.S. Cl.
CPC .... *G06F 16/24545* (2019.01); *G06F 11/3419* (2013.01); *G06F 16/2246* (2019.01); *G06N 5/022* (2013.01)

(58) Field of Classification Search
CPC .......... G06F 16/24545; G06F 16/2246; G06F 11/3419; G06N 5/022
USPC .......... 707/718, 765, 600; 718/104
See application file for complete search history.

(56) References Cited

U.S. PATENT DOCUMENTS

| | | | |
|---|---|---|---|
| 5,328,536 A | 7/1994 | Rohleder et al. | |
| 2013/0151504 A1 | 6/2013 | Konig et al. | |
| 2015/0169690 A1* | 6/2015 | Wen | G06F 16/21 |
| | | | 707/720 |
| 2015/0283790 A1 | 10/2015 | Minamitani | |
| 2017/0228259 A1* | 8/2017 | Solihin | G06F 9/5033 |
| 2018/0264788 A1 | 9/2018 | Sunagawa et al. | |
| 2019/0303475 A1 | 10/2019 | Jindal et al. | |
| 2019/0354621 A1* | 11/2019 | Wang | G06F 16/2453 |

FOREIGN PATENT DOCUMENTS

| | | |
|---|---|---|
| CA | 2202942 A1 | 10/1997 |
| EP | 0 802 045 A1 | 10/1997 |

OTHER PUBLICATIONS

Foreign Search Report on non-Foley case related to PCT PCT/US2021/048287 dated Dec. 22, 2021.
International Search Report and Written Opinion corresponding to PCT/US2020/048287, dated Aug. 12, 2020, 7 pages.

* cited by examiner

*Primary Examiner* — Giovanna B Colan
(74) *Attorney, Agent, or Firm* — Pierson Ferdinand LLP; Daniel Rose

(57) ABSTRACT

In some aspects, the disclosure is directed to methods and systems for access path selection optimization for relational database queries. Machine learning systems, such as neural networks, may be used to determine costs for each path. A neural network may be trained based on cost determinations from scans and indexes of the tree for an initial set of queries, and then may be used to predict costs for additional queries such that a path may be selected. The training data may be periodically refreshed or updated, or may be refreshed or updated responsive to changes in hardware or computing environment.

1 Claim, 11 Drawing Sheets

SYSTEMS AND METHODS FOR ARTIFICIAL INTELLIGENCE-BASED DATA SYSTEM OPTIMIZATION

RELATED APPLICATIONS

The present application claims the benefit of and priority to U.S. Provisional Patent Application No. 63/072,631, entitled "Systems and Methods for Artificial Intelligence-based Database Query Optimization," filed Aug. 31, 2020, the entirety of which is incorporated herein by reference.

FIELD OF THE DISCLOSURE

This disclosure generally relates to systems and methods for data systems. In particular, this disclosure relates to systems and methods for artificial intelligence-based database query optimization, data workload assignment, and data system tuning.

BACKGROUND OF THE DISCLOSURE

Database queries, particularly for large relational databases, may be complex and consume significant amounts of processor resources and time if not properly optimized. For example, queries may require reading every row or block within a database, which may be time-consuming for large databases, and require repeated loading and unloading data from a cache. Ideally, a query may be narrowed to identify specific blocks or ranges of blocks that may be searched, but this requires substantial knowledge of the data before crafting the query; in practice, queries may lack a priori knowledge of where an answer may be located.

Access path selection (APS) involves determining the highest performing or lowest latency path to search within a database for data retrieval. APS is difficult because an optimizer must be aware of the ever-changing system state, hardware, and data. Incorrect assumptions in any of those can be very costly, leading to searches that are too narrow and miss results or require repetition, or searches that are too broad and waste time and computing resources.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

Figures 1A, 1B:
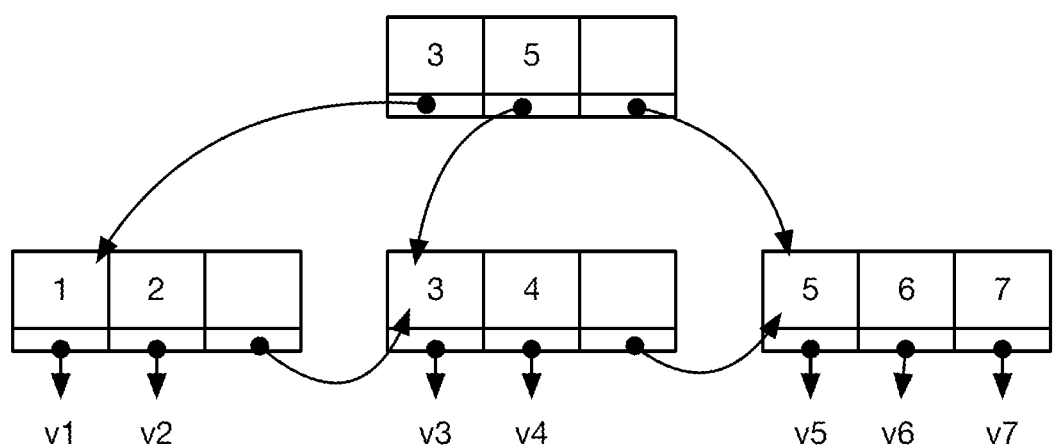
FIG. 1A is an illustration of an example data table, according to one implementation.
FIG. 1B is an illustration of an example of a B+ tree, according to one implementation.

For purposes of reading the description of the various embodiments below, the following descriptions of the sections of the specification and their respective contents may be helpful:

Section A describes embodiments of systems and methods for artificial intelligence-based data system optimization; and Section B describes a computing environment which may be useful for practicing embodiments described herein.

a. Systems and Methods for Artificial Intelligence-Based Data System Optimization Database queries, particularly for large relational databases, may be complex and consume significant amounts of processor resources and time if not properly optimized. For example, queries may require reading every row or block within a database, which may be time-consuming for large databases, and require repeated loading and unloading data from a cache. FIG. 1A is an illustration of an example data table, according to one implementation. A query such as "SELECT value FROM dataset WHERE value>=someMin AND value<someMax" may request all of the values between a minimum and maximum value. If someMin=1 and someMax=101, the query would return all of the values in the table. A typical search would involve iteratively reading each row of the table, comparing the row's value to the conditional thresholds, and returning the result. While this works well in a case where every row or almost every row is to be returned (referred to as "high selectivity"), scanning in this matter would be the fastest method, since the query execution engine needs to traverse every row in the database.

By contrast, the same query but with thresholds of someMin=10 and someMax=12 would result in very few rows returned (referred to as "low selectivity"). Scanning is highly inefficient in such cases, because every row would need to be retrieved and moved into and out of memory, despite discarding most of the results. If some a priori knowledge was available to the query execution engine, then the scan and corresponding usage of computing resources could be reduced significantly. One implementation of obtaining this knowledge is through the use of indexes built on B+ trees, in which each group of nodes contains n keys (with n selected such that each group can fit in cache memory), and each group is linked to other nodes. FIG. 1B is an illustration of an example of a B+ tree, according to one implementation. The root node at top indicates that keys with values<3 are located by traversing down one level to the left relation, keys between 3 and 5 to the middle, and keys>5 to the right. Moving from node to node incurs a cache miss because the keys have to be evacuated from memory and replaced by the next batch. However, trees are shallow, allowing travel down the tree with only a hand full of cache misses. In comparison, a scan would incur a cache miss every time we move n values into memory.

Figure 1C:
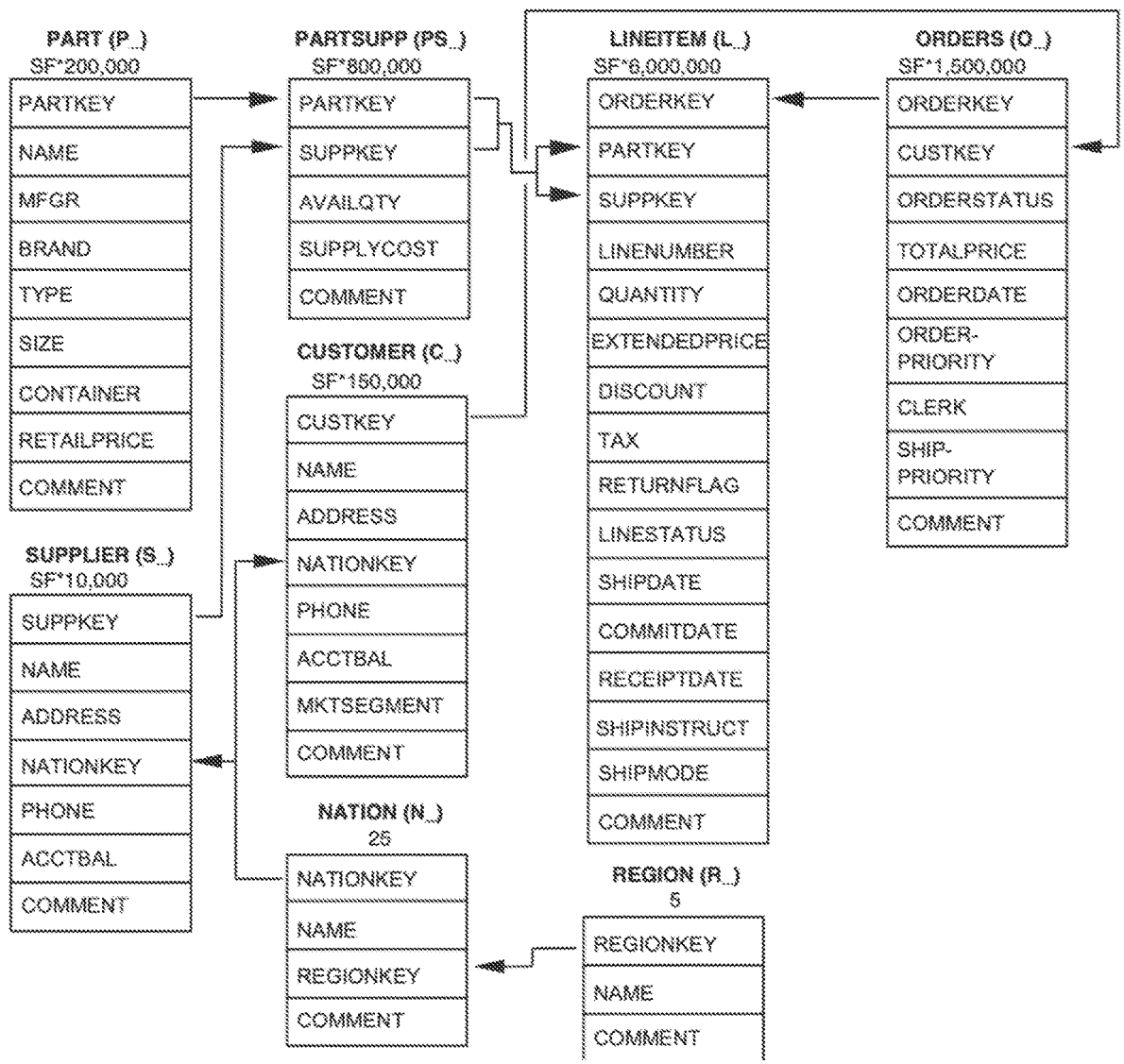
FIG. 1C is an illustration of an example relational database schema, according to one implementation.

The tree shown in FIG. 1B is simple and only has two layers. In typical implementations, the tree may be significantly more complex. For example, FIG. 1C is an illustration of an example relational database schema, according to one implementation. Each field of the schema may be associated with hundreds or thousands of records (as indicated by scale factor or SF), and with the relationships between each table, the resulting tree may have many more layers. Building the tree requires some computing resources and has a cost based on storing the data redundantly, building the tree, and maintaining it as data changes. However, when selectivity is low, the performance gain may outweigh these costs.

Figure 1D:
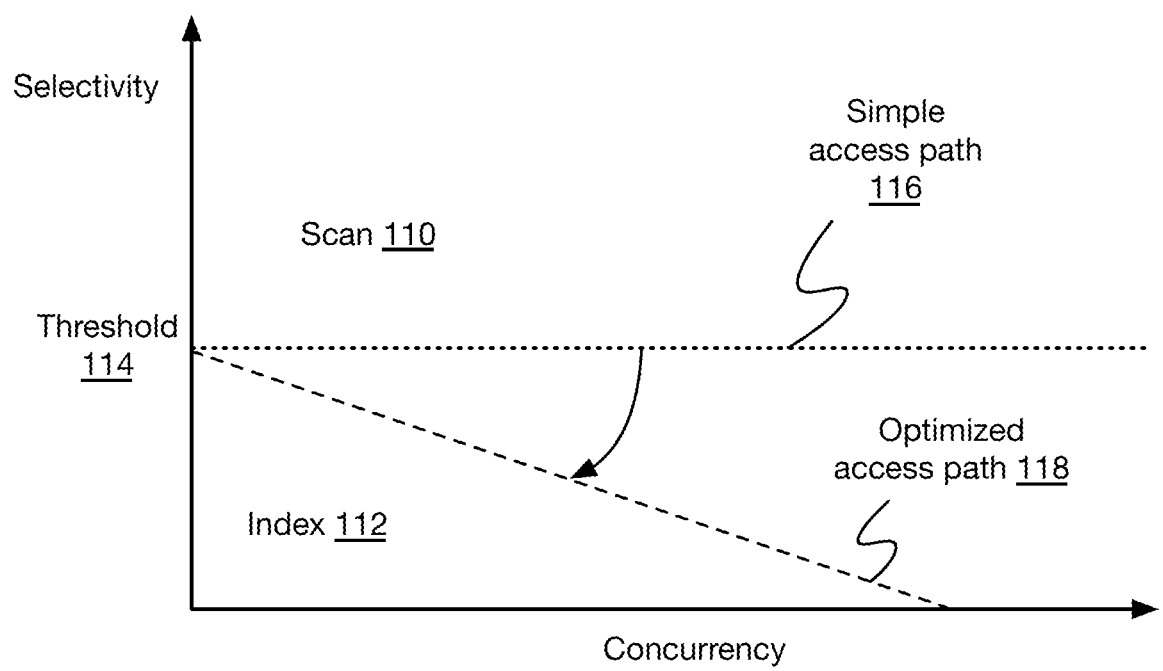
FIG. 1D is a graph of access path selection optimization relative to selectivity and concurrency, according to some implementations.

Access path selection (APS) involves determining the highest performing or lowest latency path, such as scanning or indexing, to search within a database for data retrieval. APS is difficult because an optimizer must be aware of the ever-changing system state, hardware, and data. Incorrect assumptions in any of those can be very costly, leading to searches that are too narrow and miss results or require repetition, or searches that are too broad and waste time and computing resources. FIG. 1D is a graph of access path selection optimization relative to selectivity and concurrency, according to some implementations, with a selection between scanning 110 and indexing 112. In optimization systems not using the methods and systems discussed herein, a simple selectivity threshold 114 may be utilized by an optimizer to decide between scanning 110 (e.g. if selectivity is above threshold 114) or indexing (if selectivity is below threshold 114), corresponding to access path 116. However, if the computing hardware is capable of running high numbers of concurrent queries, it may be possible to lower the decision threshold, as shown with optimized access path 118. Specifically, as concurrency increases, in many implementations, scanning queries may be subdivided across a plurality of co-processors or computing environments, increasing overall throughput despite exhaustively searching the space. Accordingly, when performing APS, it may be important to consider parameters such as workload parameters (e.g., number of queries, selectivity of query, total selectivity of the workload); dataset parameters (e.g., data size, tuple size); hardware parameters (e.g. L1 cache access (sec), LLC miss: memory access (sec), scanning bandwidth (GB/s), result writing bandwidth (GB/s), leaf traversal bandwidth (GB/s), the inverse of CPU frequency, additional factors accounting for pipelining); and scan and index parameters (e.g., result width (bytes per output tuple), tree fanout, attribute width (bytes of the indexed column), offset width (bytes of the index column offset)). Specifically, concurrency is complicated. It is not sufficient to say that processing more queries concurrently increases system performance. Aside from the overhead in allocating threads to queries, concurrent processing has side-effects such as negating other techniques employed by data systems. For example, zone maps are an optimization that seeks to minimize the traversal of unnecessary blocks of data by viewing the block as a zone. Processing concurrent queries means that there are fewer irrelevant zones to skip since the area of interest is a union of the combined queries.

In a first aspect, implementations of the systems and methods discussed herein improve on APS optimization through the use of machine learning systems, such as neural networks, to determine costs for each path. A neural network may be trained based on cost determinations from scans and indexes of the tree for an initial set of queries, and then may be used to predict costs for additional queries such that a path may be selected. The training data may be periodically refreshed or updated, or may be refreshed or updated responsive to changes in hardware or computing environment.

In another aspect, implementations of these systems and methods may be used for workload optimization via machine learning systems. Neural networks, as discussed above, may be trained to parse a graph or tree of a workflow process or application (e.g. an Apache Kafka stream, comprising one or more producers, consumers, and/or brokers arranged in a directed graph architecture; or any similar structure or application). Features of the workflow tree may be parsed via the network to determine an optimal architecture. In some implementations, workloads and/or states may be adjusted to rebalance workloads, according to analysis by the neural network. For example, the network may be used to predict or identify lowest costs paths, including costs to move data (e.g. predicting cost of data movement between states or processes, with factors including the cost to move data, the size of data to be moved, etc.).

In still another aspect, implementations of these systems and methods may be used for data system tuning and/or optimization. For example, many data systems including Apache Kafka, flint, Spark, Hadoop, Kubernetes, and others have tunable parameters. For example, within Kafka, tunable parameters within partitions, topics, and/or producers may include:

| Category | Data Point |
|---|---|
| Data | Record size and type |
| Data | Key shape and size |
| Hardware | Machine characteristics (RAM, CPU I/O speeds, processor type or speed, etc.) |
| Hardware | Network speed |
| Hardware | Disk characteristics |
| Hardware | Concurrency (e.g. threads, processes, hardware accesses, etc.) |
| Cluster | Number of partitions |
| Data | Compression type |
| Data | Transactions enabled |
| Data | Value serializer (byte array, avro, etc) |
| Data | Acks (−1, 0, 1) |
| Data | Batch size |
| Data | Buffer memory |
| Data | Linger ms |
| Data | Throughput (number per second) |
| Data | Producers or other identifiers |
| Data | I/O Performance (e.g. how states are stored, where, what type of disk, etc.) |
| Data | State storage location and/or partitions maintained |
| Data | fetch.min.bytes |
| Data | heartbeat.interval.ms |
| Data | max.partition.fetch.bytes |
| Data | session.timeout.ms |
| Data | auto.offset.reset |
| Data | client.dns.lookup |
| Data | connections.max.idle.ms |
| Data | enable.auto.commit |
| Data | fetch.max.bytes |
| Data | isolation.level |
| Data | max.poll.interval.ms |
| Data | max.poll.records |
| Data | partition.assignment.strategy |
| Data | receive.buffer.bytes |
| Data | request.timeout.ms |
| Data | security.protocol |
| Data | send.buffer.bytes |
| Data | auto.commit.interval.ms |

-continued

| Category | Data Point |
|---|---|
| Data | check.crcs |
| Data | client.rack |
| Data | fetch.max.wait.ms |
| Data | metadata.max.age.ms |
| Data | reconnect.backoff.max.ms |
| Data | reconnect.backoff.ms |
| Data | retry.backoff.ms |

Figure 2A:
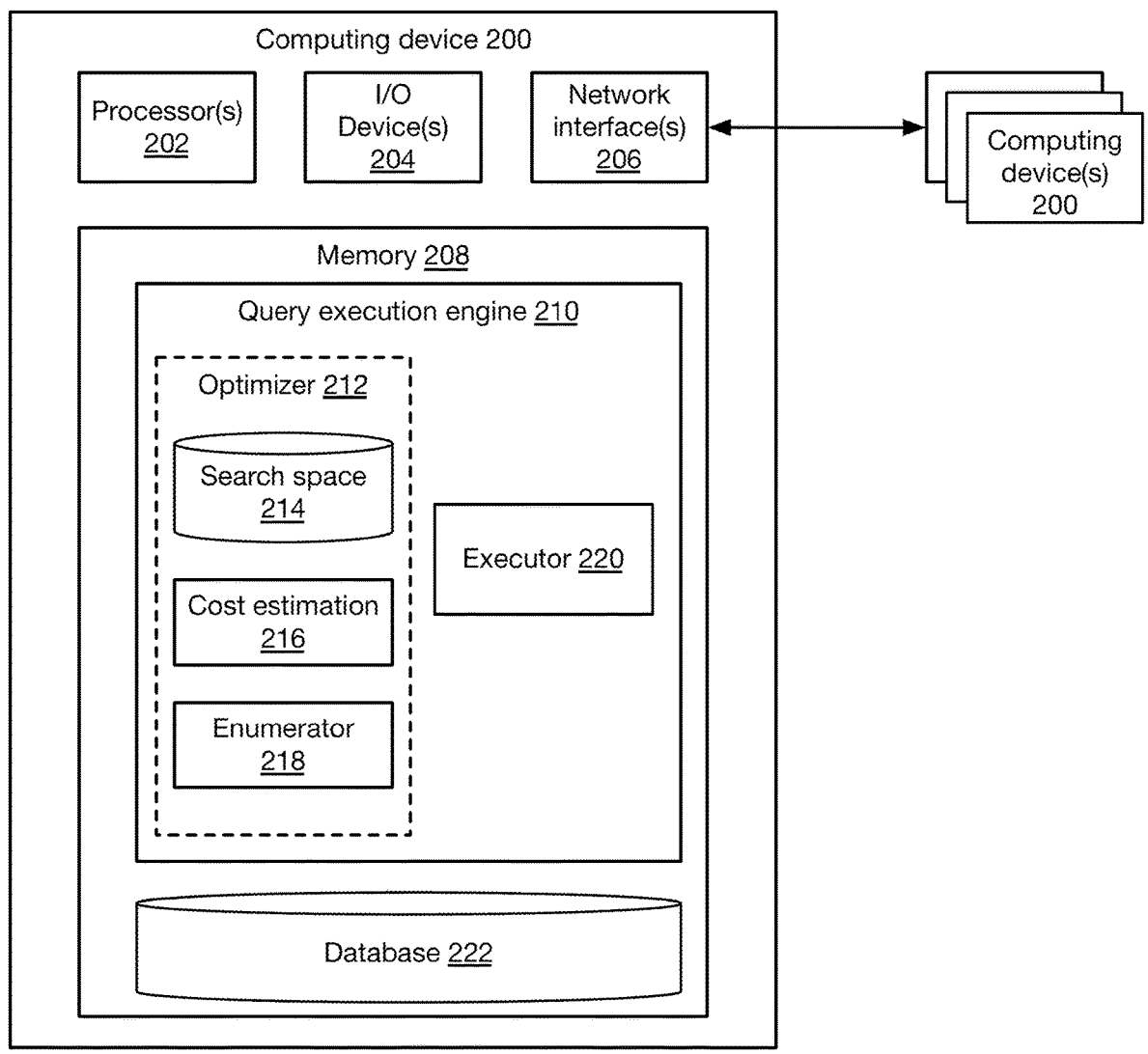
FIG. 2A is a block diagram of a system for querying a relational database, according to some implementations.

In some implementations, additional parameters that may be tuned and/or optimized include characteristics of a cluster topology (e.g. number of nodes or "ZooKeeper" servers; each node's hardware configuration; security configurations (e.g. SASL, Kerberos, etc.); network performance of each cluster device and/or the overall cluster; types of disks or other storage; threads per broker; number of partitions to replicate and how data is divided; etc.); characteristics of the data flow (e.g. categories or topics, partitions, messages per partition, topics per server, replication factor or how much work each node is responsible for, etc.); or any other such data (e.g. threads or bytes per fetch, number of data consumers in a group, number of partitions, etc.). Accordingly, in many implementations, the set of features or parameters may include one or more transport or communication configurations (including protocols, packet sizes, flow rates, paths, etc.), data storage configurations (including partitioning, storage type, etc.), and hardware or virtual hardware configurations, and wherein selecting the lowest cost query methodology further comprises selecting a transport or communication configuration, data storage configuration, or hardware or virtual configuration associated with a lowest estimated cost Using some or all of the above data or characteristics, the machine learning algorithm can identify or classify workloads as CPU intensive, memory intensive, or I/O intensive. This may be used to predict the cost of moving workloads between components and/or rebalance process flows as necessary to reduce or eliminate processing or I/O bottlenecks. FIG. 2A is a block diagram of a system for querying a relational database, according to some implementations. A computing device 200, which may comprise a desktop computer, laptop computer, tablet computer, embedded computer, cluster or farm of servers, appliance, a virtual computing device executed by one or more physical computing devices (e.g. a cloud), or any other such device, may comprise one or more processing units 202 (which may include graphics processing units (GPUs), and other co-processors such as tensor processing units (TPUs)), one or more input/output devices 204 (e.g. displays, keyboards, flash card readers, etc.), and one or more network interfaces 206 for communicating with one or more other computing device (e.g. for retrieving data, receiving queries, providing results, and/or subdividing queries amongst a plurality of computing devices for scalability). Computing device 200 may comprise a memory device 208, which may store a query execution engine 210 for execution by processors 204.

Query execution engine 210 may comprise an application, service, server, daemon, routine, or other executable logic for executing queries on a database 222, which may be stored in memory 208 as shown or accessed from another device (e.g. a storage or database server or cloud, external storage, network attached storage, etc.). Queries may be in any suitable type or format and may specify one or more conditions or parameters, ranges, fields, or other data.

Query execution engine 210 may comprise an optimizer 212 for providing an executor 220 (sometimes referred to as an execution engine, or by similar terms) with an organized search plan for performing a query. The optimizer 212 may comprise a space of query plans or search space 214. The search space 214 may comprise a list of possible query plans including permutations of join sequencing, threading scenarios, and an access path, such as indexing or scanning. Optimizer 212 may select between search plans according to a cost estimation function 216, which may determine how costly components of the plan are in terms of computing resources (e.g. memory, time, CPU usage, disk or network I/O, etc.). The estimation framework may collect statistical summaries of the data to be queried, and for each data stream, determine the statistical summary of the output data stream and estimate the cost of executing the operation. Statistical summaries may be determined offline or ahead of any queries (e.g. while the system is idle) in many implementations. Plans may vary significantly in cost due to operational variations between plans. These costs may be determined in an arbitrary unit of computation (which may be some representation in terms of disk page fetches set relative to the value of a seq_page_cost parameter or any other such value). Costs may be compared relative to each other to identify a lowest cost plan within the computation unit—while this may not select a non-arbitrary unit such as Watt-hours of energy utilized by the computer, it may still be useful for identifying a lowest cost plan. Accordingly, as used herein, "costs" may not necessarily be a monetary cost or other real-world cost, but may represent complexity or operations. In many implementations, these costs may consider only a subset of operations (e.g. processing, filtering, etc.), but may ignore other operations that contribute to query elapsed times (e.g. transmitting results to a client) as they may be common to all versions, regardless of how the optimizer modifies the work plan.

An enumeration algorithm 218 of query execution engine 210 may select the least expensive plan to execute, and may include a set of policies or rules for plan selection. These rules may be predetermined or set by an administrator or user of the system, or maybe dynamically determined in some implementations. In some implementations, the enumeration algorithm may return the lowest latency plan from a predicted set. For example, in some implementations, the enumeration algorithm may comprise the following pseudo-code:

$V(p)$=predict (p), for all p∈P/prediction for each plan in the plan space P
best=$V(0)$
for each p∈P do/for each plan p in the plan space P
  if $V(p)$<best then
    best←$V(p)$
  end if
end for
return best Advantageously, the enumeration algorithm does not need to determine the cost of components of the plan, nor which operations are required. The algorithm may return the lowest latency plan from the predicted set. Once a plan is selected, executor 220 may execute the plan and return the queried data.

Executor 220 may comprise an application, service, daemon, routine, server, or other executable logic for managing one or more worker threads, sometimes referred to as processing threads, workers, or other such terms. Worker threads may be spawned by the executor to execute a task. Executor 220 may spawn a plurality of worker threads for executing tasks in parallel, and may coordinate execution (including managing synchronization) between threads. In some implementations, executor 220 may be referred to as a parent or coordinating thread.

Figure 2B:
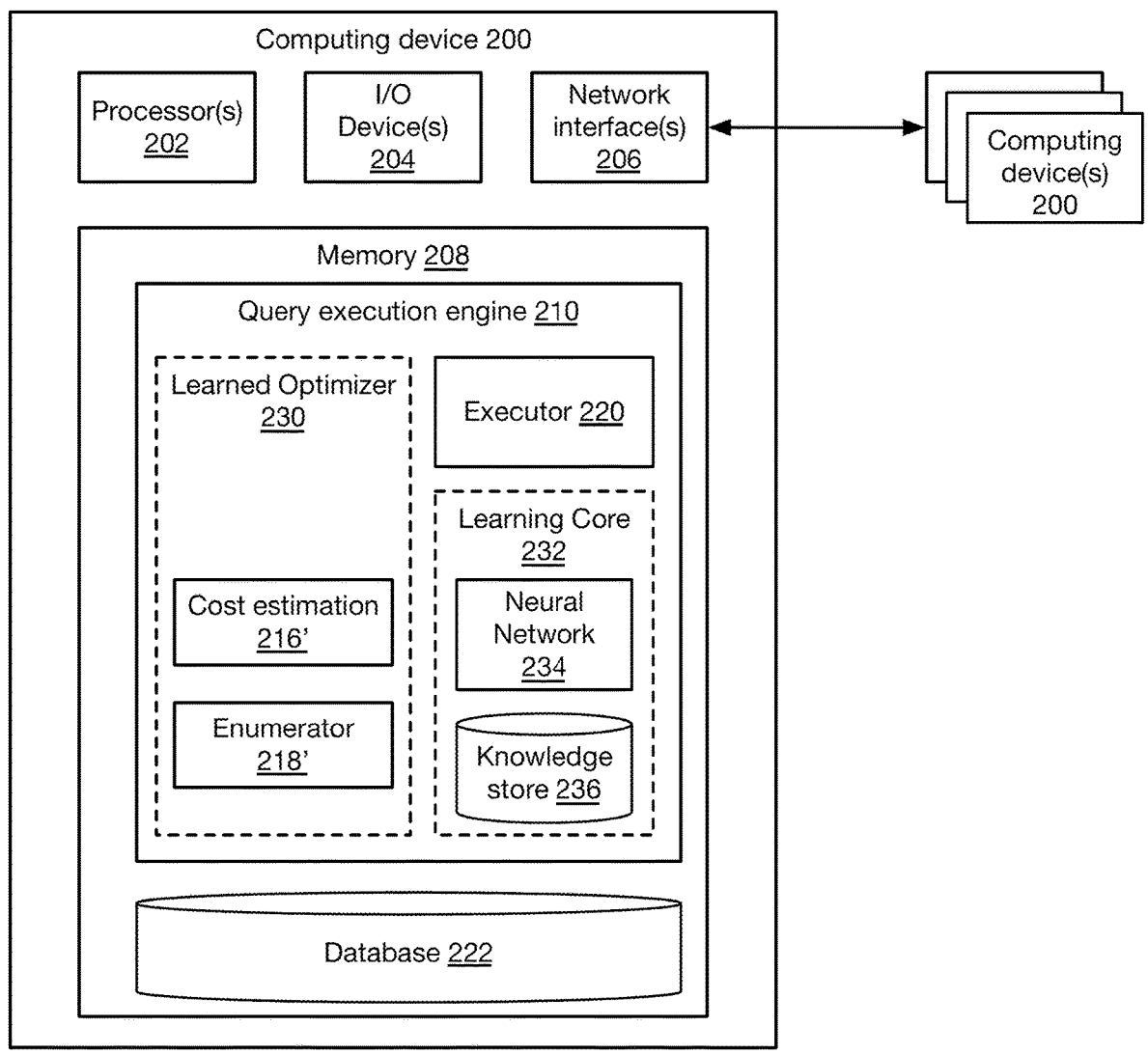
FIG. 2B is a block diagram of an artificial intelligence-based system for database query optimization, according to some implementations.

As discussed above, optimizers such as optimizer 212 may suffer from a lack of knowledge or insight about the data to be queried, and may as a result statistically overestimate or underestimate costs for performing various plans, resulting in erroneous selection of a query plan and wasting computing resources. Instead, in some implementations, optimizer 212 may be replaced with a learned optimizer 230 and learning core 232, as illustrated in the block diagram of FIG. 2B. Learned optimizer may perform a simplified cost estimation 216' and enumeration 218' based on costs estimated via learning core 232.

Learning core 232 may comprise a machine learning algorithm, such as a neural network 234 (although other algorithms may be used in other implementations, such as a logistic regression or k-nearest neighbor classifier) and knowledge store 236. In some implementations, neural network 234 may be trained from training data generated from a grid search of parameter combinations, including variations in hardware (how much memory is available, how many processing cores are available, etc.) and query selectivity, as well as system configurations (what indexes are available), access methods (e.g. scanning vs. b-trees, and whether multithreading is utilized), etc. with measured query latencies or costs. The grid search may utilize hundreds or thousands of variations of a predetermined set of base queries on a database, such as the example schema of FIG. 1C. Once the results are measured, the neural network may be trained in a supervised learning method with input features and output cost estimations. Input features may include hardware features, such as processor type, supported instructions, and memory attributes; system features, such as indexes available to the system; optimizer features for tuning, such as metadata regarding network or memory pressure, etc.; and predicate features related to the query, such as columns, operations, values, ordinal position or order of operations, etc. These features may be vectorized (e.g. via one hot encoding or similar methods for categorial features or those whose value can take on only one of a limited set, and continuous variables for other features, which may scaled or normalized in some implementations) for input to the network.

The knowledge store 236 may comprise a database or array of tuples of feature vectors and observed or measured latency, and may be updated periodically (e.g. during idle periods or when first instantiated) or responsive to changes in the database or system (e.g. responsive to changes in hardware, or modifying the data schema such as adding a new index or column). The updating may be referred to as bootstrapping, and may be total or partial (e.g. incremental, such as on minor changes to data or schema).

In some implementations, the neural network 234 may comprise a multilayer perceptron with one or more hidden layers, with various combinations of linear or rectified linear unit (ReLU) activation functions. Backpropagation in the network may be used for training, with a scalar cost or loss during a forward pass (e.g. via a sum of squares calculation), and a gradient of the cost function with respect to the parameters (e.g. via a calculus chain rule).

Figure 2C:
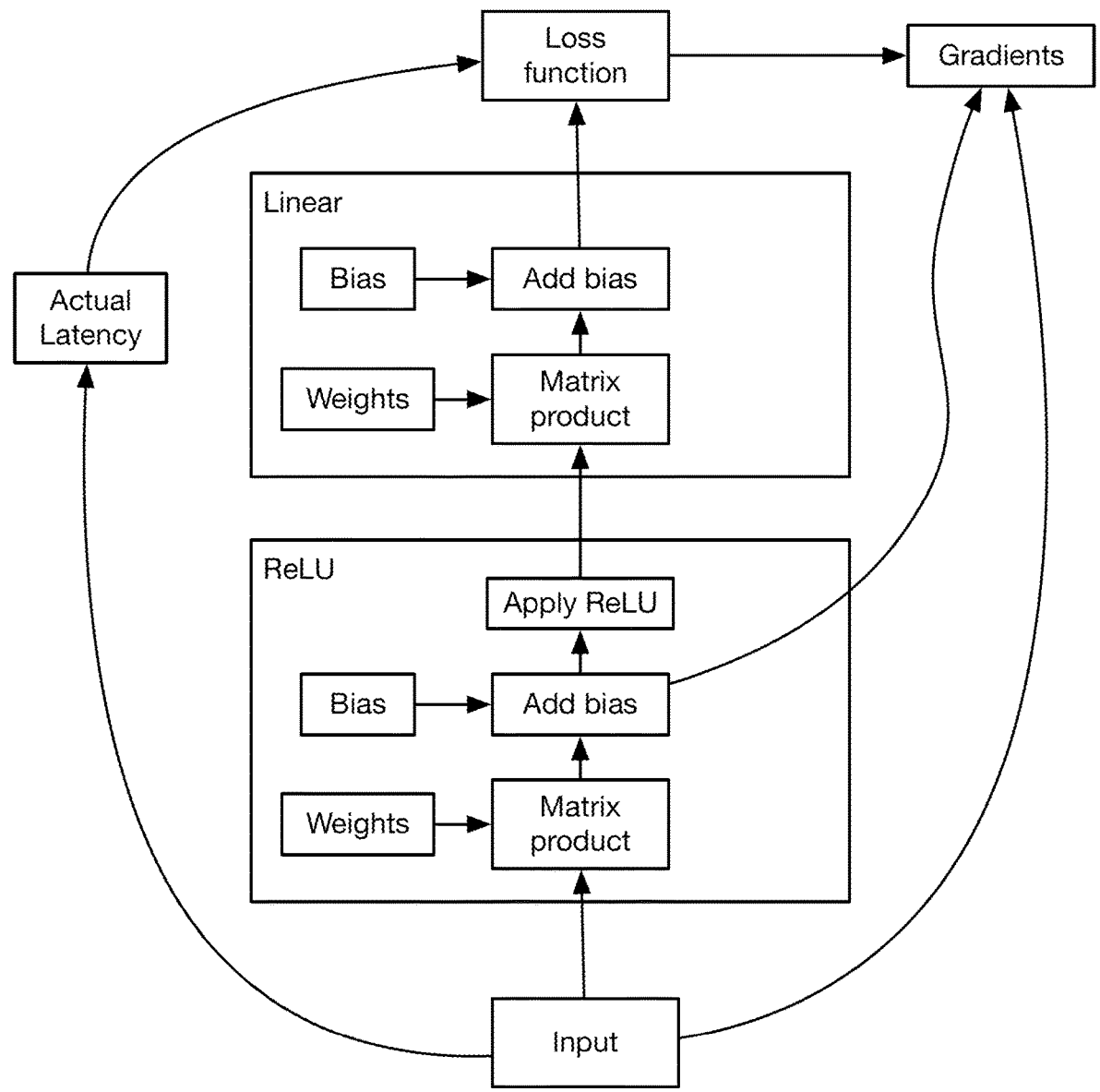
FIG. 2C is a block diagram of an example neural network for database query optimization, according to some implementations.

Referring briefly to FIG. 2C, illustrated is a block diagram of an example neural network for database query optimization, according to some implementations. Computed weights are passed to a loss function, which is used to update the gradients. Various loss functions may be utilized depending on implementation, such as mean-squared-error (MSE), mean absolute percentage error (MAPE), or other such functions, including modified loss functions that vary weights more heavily depending on selectivity. Although shown with a first ReLU unit followed by a first linear unit, in various implementations, these units may be in reversed order, and/or additional units may be included. For example, in some implementations, a model may include a first ReLU unit and a second ReLU unit; three ReLU units; a first ReLU unit followed by a linear unit followed by a second ReLU unit; three pairs of ReLU and linear units, etc. Each ReLU unit may have the same or a different number of neurons in a hidden layer, including 256, 512, 1024, or any other such number.

Returning to FIG. 2B, once trained on the knowledge store data, the neural network may be used to estimate a cost or latency for a newly received query. The predicted latency or costs for each access path may be provided to the learned optimizer, which may select the lowest cost path via cost estimation 214' and enumerator 216', as discussed above. Advantageously, because cost estimation 214' and enumerator 216' are similar to cost estimation 214 and enumerator 216, the learned optimizer 230 and learning core 232 may be easily implemented with systems such as that of FIG. 2A with minimal modifications.

Figure 3:
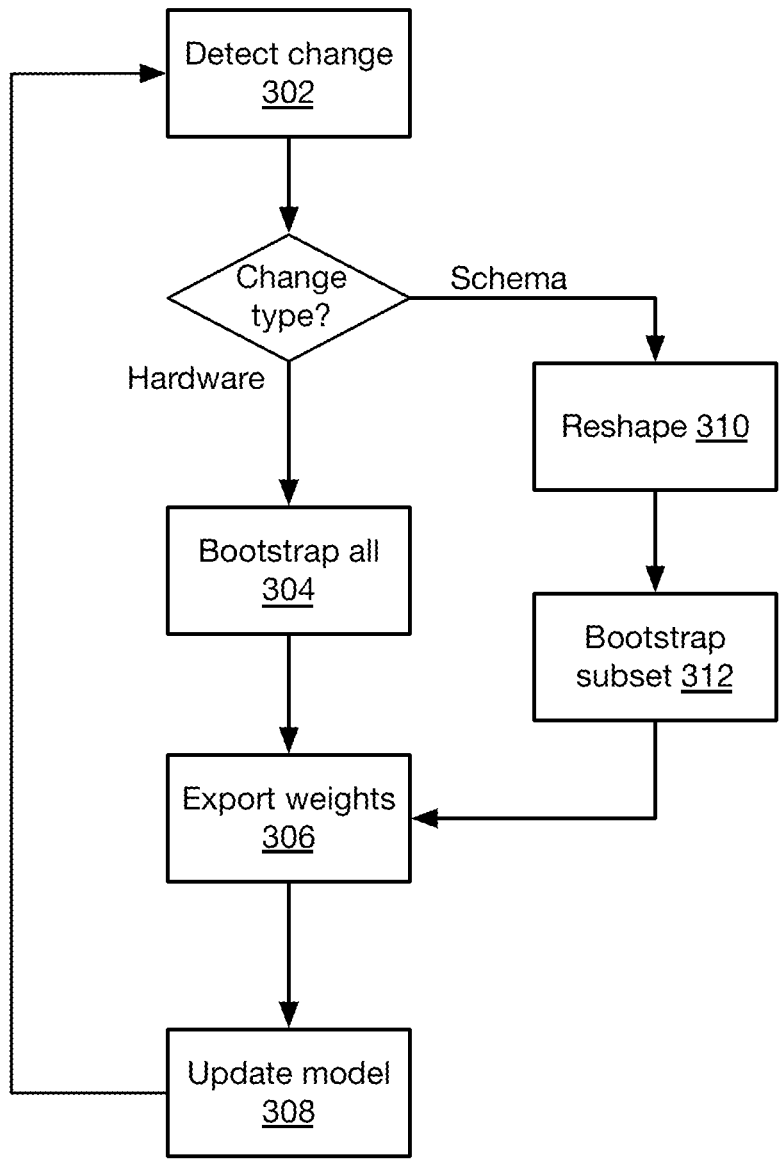
FIG. 3 is a flow chart of a method for training a machine learning system for database query optimization, according to some implementations.

As discussed above, knowledge store 236 may be bootstrapped or trained, either partially or totally in various implementations. FIG. 3 is a flow chart of a method for training a machine learning system for database query optimization, according to some implementations. At step 302, a change in the system may be detected (e.g. either new instantiation of the system, or a change in hardware or schema of the database). If the change involves hardware (including new instances of the system), then at step 304, the training data may be bootstrapped as discussed

| Filter | ToTable | Rocks State Store | Mem State-Store | Redis State-Store | Map | FlatMap | FKJoin | Join etc. |
|---|---|---|---|---|---|---|---|---|
| 4 | 4 | 5 | 0 | 0 | 1 | 1 | 3 | 1 etc. | above (e.g. performing a comprehensive grid search and measurement of latencies). The resulting weights may be exported at step 306 and the neural network model updated at step 308. If the change is limited to schema changes, then partial bootstrapping may be performed by reshaping the training data at step 310 in accordance with the schema changes, and bootstrapping with a subset of the data and queries that are modified as a result of the schema changes. The weights may then be exported as above at step 306, and the neural network model updated at step 308 as discussed above.

As discussed above, in some implementations, the systems and methods discussed herein may be used for workload optimization via machine learning systems. For example, when optimizing workflow across a cluster of nodes, in addition to optimizing the per-node workflow, the system can consider the cluster topology and whether it can be refined, and may take into account session timeouts, rebalancing times, times to take assignments or restore states, time to leave or join groups (including synchronizing), the effects of missed heartbeats or timing signals, etc.; may also consider hardware utilization, throughput, latency, I/O reads and writes, memory utilization; and may take actions including adding or removing partitions from a topic, changing group subscriptions, moving data between nodes, etc.

Figure 4:
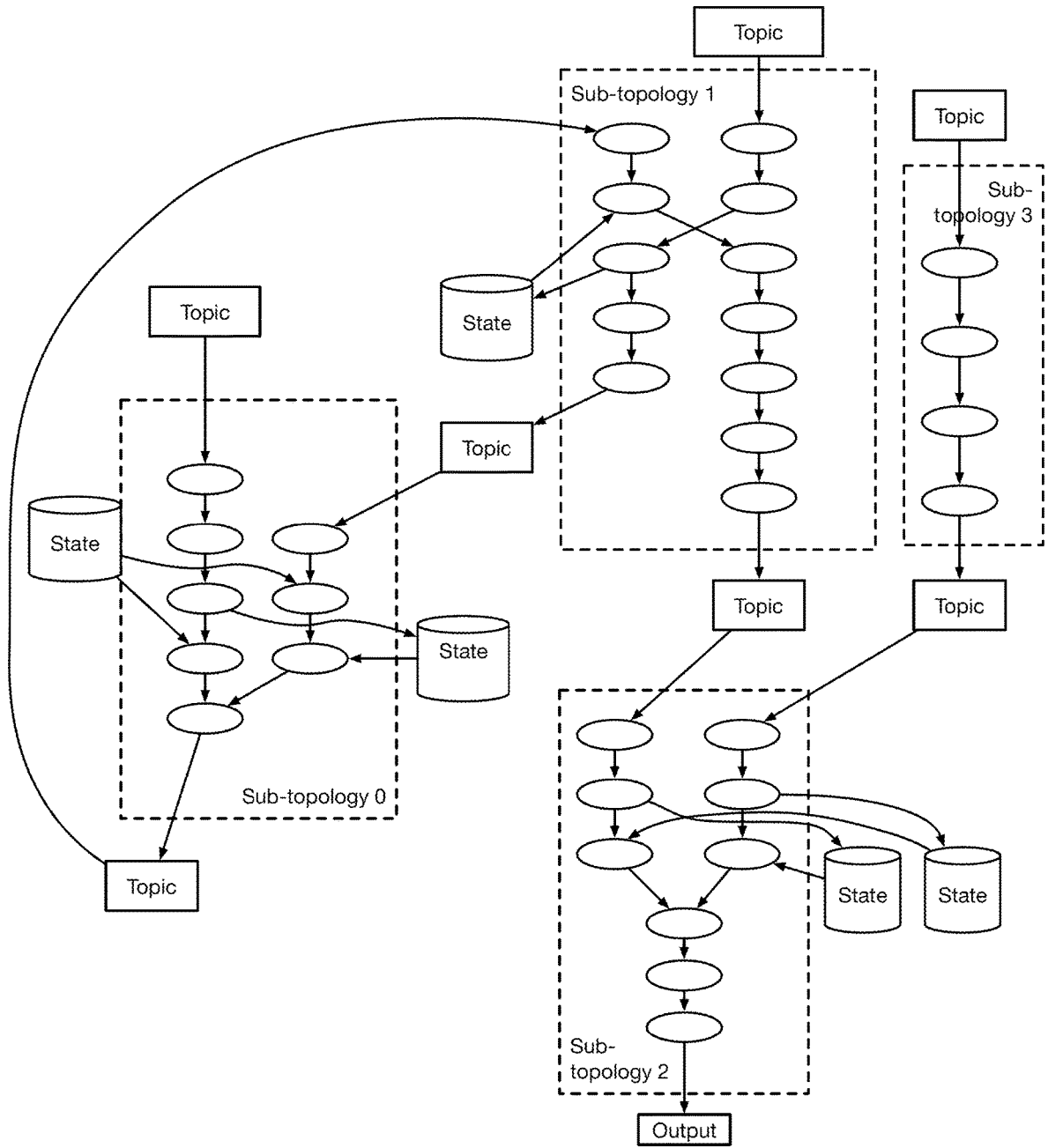
FIG. 4 is a graph of an example stream topology, according to some implementations.

In one such implementation, a topology of a workflow may be encoded into an array or table, along with the type of operations (e.g. joins, maps, filters, etc.) and whether they are stateless or stateful. The encoding may identify the types and numbers of states stored, the number of intermediate topics, the order of operations, the number of source topics and subtopologies and their ingress rates, and the number of branches. For example, referring briefly to FIG. 4, illustrated is a graph of an example stream topology, according to some implementations. Although not all processes are shown with labels for clarity, the white circles may represent filters, mapping between tables and streams, data sources or sinks, joins, merges, etc. The example illustrated in FIG. 4 includes the following operations and entities:

Filters: 4;
ToTable: 4;
State Store: 5, Kind: RocksDB (could be memory, RocksDB, redis, or any other type of storage)
Map: 1
Flatmap: 1
FK-Join: 3
Join: 1
Merge: 2
Source: 7
Sink: 5
Forks/Subtopologies: 4
Source topics: 3
Destination Topics or partitions: 1
Intermediate Topics or partitions: 2

In some implementations, this may be encoded in a multi-dimensional vector or array as:
(only the beginning of the vector or array is shown due to space limitations).

| Note | Filter | To Table | Use Rocks | Use Mem | Use Redis | ... | Sink | Topology | Creates Intermediate Topic |
|---|---|---|---|---|---|---|---|---|---|
| KStream-FILTER-0005 | 1 | 0 | 0 | 0 | 0 | 0 | 0 | 1 | 0 |
| KTable-Sink-0017 | 0 | 0 | 0 | 0 | 0 | 0 | 1 | 0 | 1 |
| KStream-TOTABLE-0003 | 0 | 1 | 1 | 0 | 0 | 0 | 0 | 0 | 0 |
| etc. | | | | | | | | | |

Each individual node may then be separately encoded in a multi-dimensional vector or array, identifying the characteristics and topology of the node, such as:
(some columns are removed due to space limitations, and only a small subset of nodes are shown). These arrays may be used as input features for analysis or classification by the neural network classifier, as discussed above. The network may be used to predict the latency of a topology and/or optimize the topology for latency, predict the lowest penalty for data movement or rebalancing of nodes and work, and/or predict the complexity of a topology or workload based on the structure or data characteristics.

Although talked about primarily in terms of pre-trained networks, in some implementations, the training phase may be integrated into usage with reinforcement learning. An interpreter process may monitor performance of the network and provide a positive or negative reward to an agent that is taking actions to modify the network, resulting in a gradual performance improvement over time. For example, in some implementations, increases or decreases in latency or throughput may be monitored and used to provide positive and negative rewards to the system as it modifies the network hyper parameters.

Figure 5:
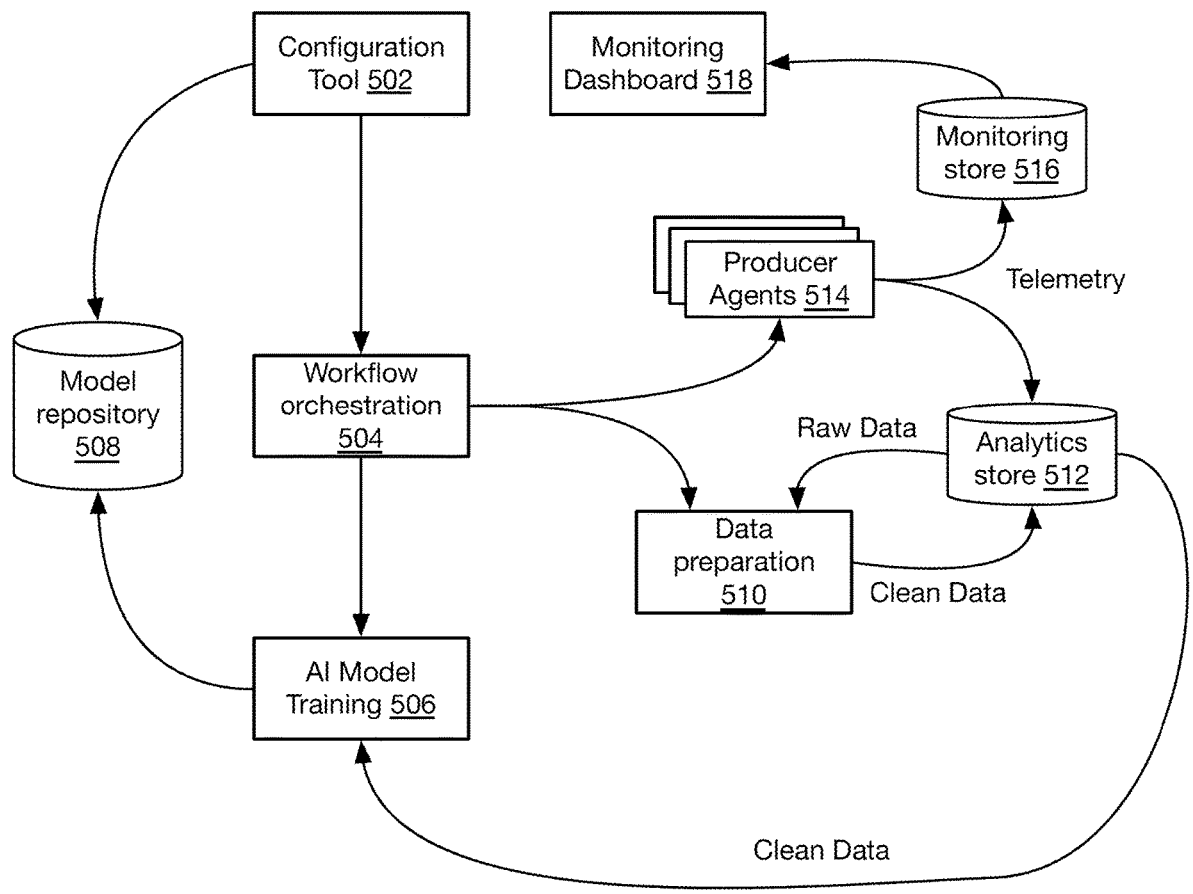
FIG. 5 is a block diagram of an artificial intelligence workflow optimization system, according to some implementations.

FIG. 5 is a block diagram of an artificial intelligence workflow optimization system, according to some implementations. A configuration tool 502 may be used to configure hyper parameters of a neural network (e.g. number of nodes per layer, number of layers, back propagation weights, etc.), with a model stored in model repository 508. The model may be trained in training step 506 according to data observed during work processing (e.g. for reinforcement learning and/or retraining) as well as on processed or clean data stored in an analytics store 512. Clean data may comprise, for example, tuples of feature vectors and characteristics to optimize (e.g. $\tau$=([feature vectors], observed latency) or similar). Workflows may be provided to producer agents 514 (e.g. Java Apps, Kubernetes, Stream processors, etc.). Data (e.g. raw data) may be prepared for processing (and/or subsequent analysis) via data preparation engine 510.

Processing may be monitored and telemetry data provided to monitoring store 516 (as well as stored in analytics store 512 for retraining the AI model). A monitoring dashboard engine 518 may be used to display monitoring data to administrators, allowing for observation of the system during runtime.

Accordingly, the systems and methods discussed herein provide for artificial intelligence-based access path selection optimization for relational database queries. A machine learning system may be used to determine costs for each access path, such as a neural network trained based on cost determinations from scans and indexes for an initial set of queries, and then may be used to predict costs for additional queries such that a path may be selected. The training data may be periodically refreshed or updated, or may be refreshed or updated responsive to changes in hardware or computing environment.

In a first aspect, the present disclosure is directed to a system for machine learning-based optimization of a data system. The system includes a computing system comprising one or more memory devices storing a knowledge store comprising tuples of a set of features and observed characteristics of a query response, and one or more processors executing: a learned optimizer configured to estimate a cost for each of a plurality of alternate query methodologies for performing a given query of a database maintained by one or more computing device, and select a lowest cost query methodology; an executor in communication with the database, the executor configured to perform the given query according to the selected lowest cost query methodology;

and a learning core configured to generate a tuple of the knowledge store from a response to the given query, and comprising a neural network configured to predict the characteristics for each query response; and the learned optimizer utilizes model weights of the neural network to estimate the costs for each of the plurality of alternate query methodologies.

In some implementations, the observed characteristics of the query responses comprise measurements of a response latency. In some implementations, the set of features of a tuple are encoded as a multi-dimensional vector. In some implementations, the alternate query methodologies each have different access paths within the database, each access path comprising one or more processing functions. In a further implementation, each processing function is associated with a cost, and the learned optimizer is configured to estimate the cost for each of the plurality of alternate query methodologies by identifying a cost for each function of the access path of the alternate query methodology, and aggregating the identified costs. In a still further implementation, the learned optimizer is further configured to determine the cost of each processing function according one or more tuples of the knowledge store and a corresponding query methodology for each of the one or more tuples. In some implementations, the alternate query methodologies include at least one scan methodology and at least one index methodology.

In another aspect, the present disclosure is directed to a method for machine learning-based optimization of a data system. The method includes estimating, by a learned optimizer of a computing system, a cost for each of a plurality of alternate query methodologies for performing a given query of a database from one or more tuples comprising a set of features and observed characteristics of query responses, the one or more tuples generated by a learning core of the computing system and stored in a knowledge store comprising one or more memory devices, the database maintained by one or more computing devices. The method also includes selecting, by the learned optimizer, a lowest cost query methodology based on the estimated costs. The method also includes executing, by an executor of the computing system in communication with the database, the given query according to the selected query methodology.

In some implementations, the method includes using model weights of a neural network of the learning core to estimate the costs for each of the plurality of alternate query methodologies, the neural network configured to predict the characteristics for each query response from the set of features. In some implementations, the observed characteristics of the query responses comprise measurements of a response latency. In some implementations, the set of features of a tuple are encoded as a multi-dimensional vector.

In some implementations, the alternate query methodologies each have different access paths within the database, each access path comprising one or more processing functions. In a further implementation, each processing function is associated with a cost, and estimating the cost for each of the plurality of alternate query methodologies further comprises identifying a cost for each function of the access path of the alternate query methodology, and aggregating the identified costs. In a still further implementation, the method includes determining, by the learned optimizer, the cost of each processing function according one or more tuples of the knowledge store and a corresponding query methodology for each of the one or more tuples. In some implementations, the alternate query methodologies include at least one scan methodology and at least one index methodology.

In another aspect, the present disclosure is directed to a non-transitory computer readable medium comprising instructions that, when executed by one or more processors of a computing system, cause the computing system to: estimate a cost for each of a plurality of alternate query methodologies for performing a given query of a database from one or more tuples comprising a set of features and observed characteristics of query responses, the one or more tuples generated by a learning core of the computing system and stored in a knowledge store comprising one or more memory devices, the database maintained by one or more computing devices; select a lowest cost query methodology based on the estimated costs; and execute the given query according to the selected query methodology.

In some implementations, the alternate query methodologies each have different access paths within the database, each access path comprising one or more processing functions. In a further implementation, each processing function is associated with a cost, and the computer readable medium further includes instructions to identify a cost for each function of the access path of the alternate query methodology, and aggregate the identified costs. In a still further implementation, the computer readable medium includes instructions to determine the cost of each processing function according one or more tuples of the knowledge store and a corresponding query methodology for each of the one or more tuples. In some implementations, the alternate query methodologies include at least one scan methodology and at least one index methodology.

In still another aspect, the present disclosure is directed to a method for machine learning-based optimization of a data system. The method includes, for each of a plurality of candidate worker threads, estimating, by a learned optimizer of a computing system, a cost to execute a modification of a stored data state, the cost estimated according to a neural network model trained from historical observations of costs of data state modifications by the candidate worker threads. The method also includes selecting, by the learned optimizer, a lowest cost candidate worker thread to perform the modification of the stored data state based on the estimated costs. The method also includes executing, by an executor of the computing system using the selected worker thread, the modification.

B. Computing Environment

Having discussed specific embodiments of the present solution, it may be helpful to describe aspects of the operating environment as well as associated system components (e.g., hardware elements) in connection with the methods and systems described herein.

Figure 6A:
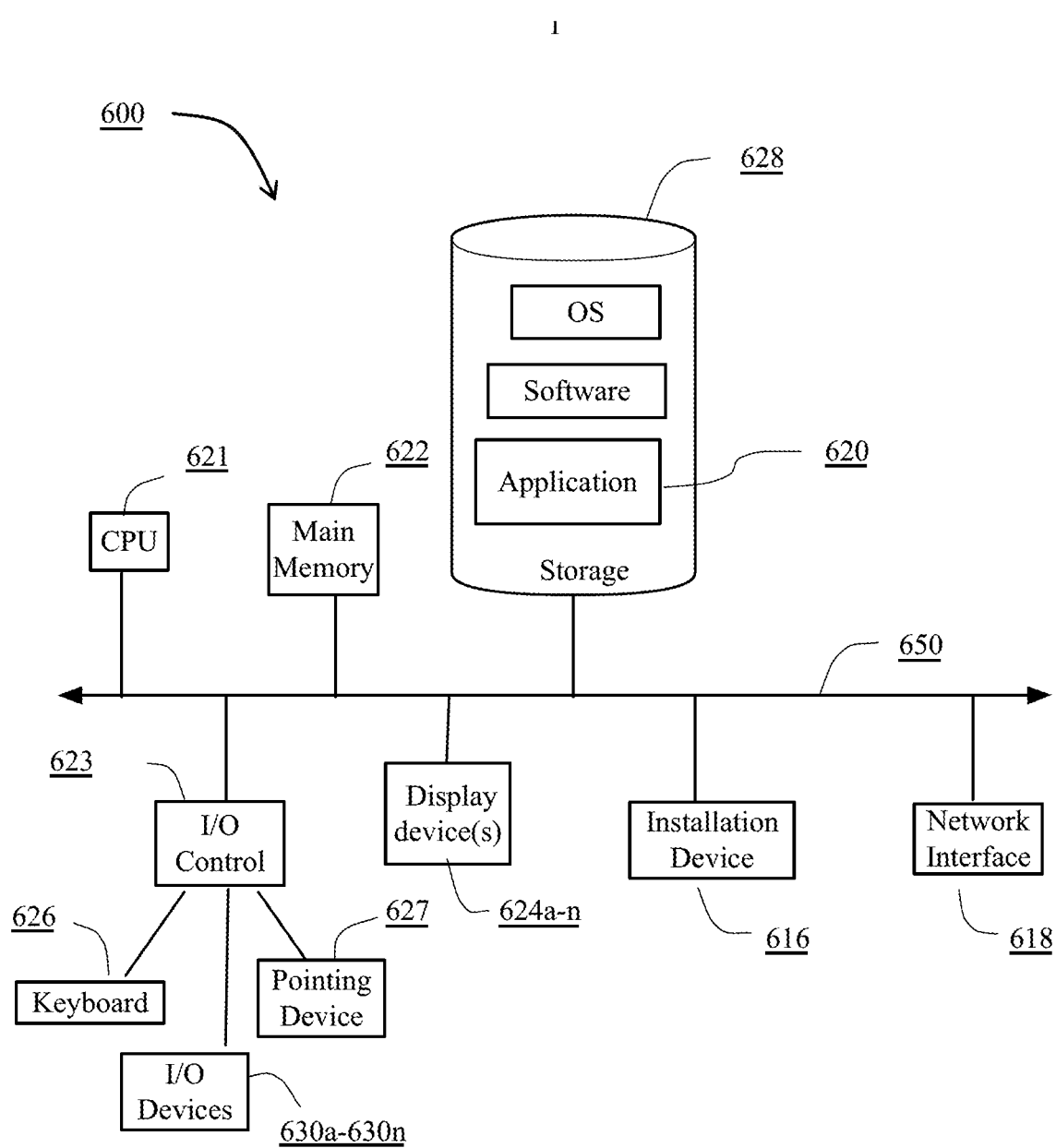
FIGS. 6A and 6B are block diagrams depicting embodiments of computing devices useful in connection with the methods and systems described herein.
Figure 6B:
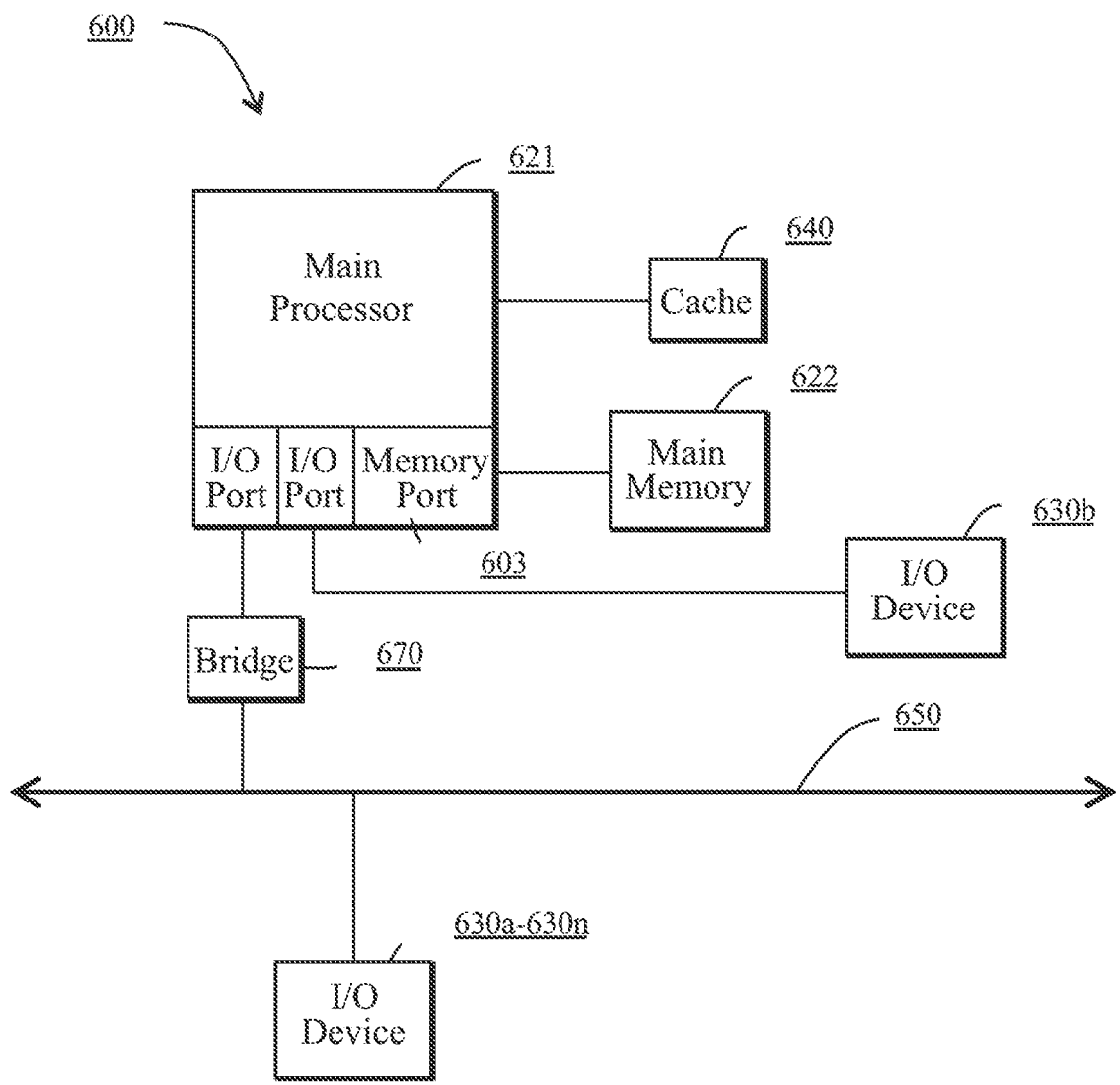

The systems discussed herein may be deployed as and/or executed on any type and form of computing device, such as a computer, network device or appliance capable of communicating on any type and form of network and performing the operations described herein. FIGS. 6A and 6B depict block diagrams of a computing device 600 useful for practicing an embodiment of the wireless communication devices 602 or the access point 606. As shown in FIGS. 6A and 6B, each computing device 600 includes a central processing unit 621, and a main memory unit 622. As shown in FIG. 6A, a computing device 600 may include a storage device 628, an installation device 616, a network interface 618, an I/O controller 623, display devices 624a-624n, a keyboard 626 and a pointing device 627, such as a mouse. The storage device 628 may include, without limitation, an operating system and/or software. As shown in FIG. 6B, each computing device 600 may also include additional optional elements, such as a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 600 may be based on any of these processors, or any other processor capable of operating as described herein.

Main memory unit 622 may be one or more memory chips capable of storing data and allowing any storage location to be directly accessed by the microprocessor 621, such as any type or variant of Static random access memory (SRAM), Dynamic random access memory (DRAM), Ferroelectric RAM (FRAM), NAND Flash, NOR Flash and Solid State Drives (SSD). The main memory 622 may be based on any of the above described memory chips, or any other available memory chips capable of operating as described herein. In the embodiment shown in FIG. 6A, the processor 621 communicates with main memory 622 via a system bus 650 (described in more detail below). FIG. 6B depicts an embodiment of a computing device 600 in which the processor communicates directly with main memory 622 via a memory port 603. For example, in FIG. 6B the main memory 622 may be DRDRAM.

FIG. 6B depicts an embodiment in which the main processor 621 communicates directly with cache memory 640 via a secondary bus, sometimes referred to as a backside bus. In other embodiments, the main processor 621 communicates with cache memory 640 using the system bus 650. Cache memory 640 typically has a faster response time than main memory 622 and is provided by, for example, SRAM, BSRAM, or EDRAM. In the embodiment shown in FIG. 6B, the processor 621 communicates with various I/O devices 630 via a local system bus 650. Various buses may be used to connect the central processing unit 621 to any of the I/O devices 630, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the processor 621 may use an Advanced Graphics Port (AGP) to communicate with the display 624. FIG. 6B depicts an embodiment of a computer 600 in which the main processor 621 may communicate directly with I/O device 630b, for example via HYPERTRANSPORT, RAPIDIO, or INFINIBAND communications technology. FIG. 6B also depicts an embodiment in which local busses and direct communication are mixed: the processor 621 communicates with I/O device 630a using a local interconnect bus while communicating with I/O device 630b directly.

A wide variety of I/O devices 630a-630n may be present in the computing device 600. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 623 as shown in FIG. 6A. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices such as the USB Flash Drive line of devices manufactured by Twintech Industry, Inc. of Los Alamitos, California.

Referring again to FIG. 6A, the computing device 600 may support any suitable installation device 616, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 600 may further include a storage device, such as one or more hard disk drives or redundant arrays of independent disks, for storing an operating system and other related software, and for storing application software programs such as any program or software 620 for implementing (e.g., configured and/or designed for) the systems and methods described herein. Optionally, any of the installation devices 616 could also be used as the storage device. Additionally, the operating system and the software can be run from a bootable medium.

Furthermore, the computing device 600 may include a network interface 618 to interface to the network 604 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 600 communicates with other computing devices 600' via any type and/or form of gateway or tunneling protocol such as Secure Socket Layer (SSL) or Transport Layer Security (TLS). The network interface 618 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

In some embodiments, the computing device 600 may include or be connected to one or more display devices 624a-624n. As such, any of the I/O devices 630a-630n and/or the I/O controller 623 may include any type and/or form of suitable hardware, software, or combination of hardware and software to support, enable or provide for the connection and use of the display device(s) 624a-624n by the computing device 600. For example, the computing device 600 may include any type and/or form of video adapter, video card, driver, and/or library to interface, communicate, connect or otherwise use the display device(s) 624a-624n. In one embodiment, a video adapter may include multiple connectors to interface to the display device(s) 624a-624n. In other embodiments, the computing device 600 may include multiple video adapters, with each video adapter connected to the display device(s) 624a-624n. In some embodiments, any portion of the operating system of the computing device 600 may be configured for using multiple displays 624a-624n. One ordinarily skilled in the art will recognize and appreciate the various ways and embodiments that a computing device 600 may be configured to have one or more display devices 624a-624n.

In further embodiments, an I/O device 630 may be a bridge between the system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 600 of the sort depicted in FIGS. 6A and 6B may operate under the control of an operating system, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 600 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 600 has sufficient processor power and memory capacity to perform the operations described herein.

In some embodiments, the computing device 600 may have different processors, operating systems, and input devices consistent with the device. For example, in one embodiment, the computing device 600 is a smart phone, mobile device, tablet or personal digital assistant. In still other embodiments, the computing device 600 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A method for training an optimizer for a data system, comprising:

for each of a plurality of queries of a database maintained by one or more computing devices, each query associated with one or more features:

receiving, by a computing system, the query, executing, by the computing system, the query using a first query methodology, measuring, by the computing system, one or more characteristics of the one or more computing devices while executing the query using the first query methodology, generating, by the computing system, a first tuple comprising the one or more features of the query and the one or more characteristics measured while executing the query using the first query methodology, executing, by the computing system, the query using a second query methodology, measuring, by the computing system, the one or more characteristics of the one or more computing devices while executing the query using the second query methodology, and generating, by the computing system, a second tuple comprising the one or more features of the query and the one or more characteristics measured while executing the query using the second query methodology; and training, by the computing system, a learned optimizer from the first and second tuple generated for each of the plurality of queries, the learned optimizer comprising a neural network trained to estimate a cost for performing a new query via each of the first query methodology and the second query methodology based on the one or more features of the new query.

* * * * *